United States Patent
Uhrenholt

(10) Patent No.: US 11,127,188 B1
(45) Date of Patent: Sep. 21, 2021

(54) SUSPENDING AND RESUMING OPERATIONS IN GRAPHICS PROCESSING SYSTEMS

(71) Applicant: Arm Limited, Cambridge (GB)

(72) Inventor: Olof Henrik Uhrenholt, Lomma (SE)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/931,719

(22) Filed: Jul. 17, 2020

(51) Int. Cl.
*G06T 1/20* (2006.01)
*G06T 15/00* (2011.01)

(52) U.S. Cl.
CPC .............. *G06T 15/005* (2013.01); *G06T 1/20* (2013.01)

(58) Field of Classification Search
CPC ......... G06T 1/20; G06T 15/005; G06T 17/10; G06F 9/3851; G06F 9/461; G06F 9/462; G06F 9/4812; G06F 9/4843
USPC .................................. 345/501; 718/102, 108
See application file for complete search history.

(56) References Cited

U.S. PATENT DOCUMENTS

| | | | |
|---|---|---|---|
| 2014/0184617 A1* | 7/2014 | Palmer | G06T 1/20 345/506 |
| 2019/0005604 A1* | 1/2019 | Acharya | G06T 15/005 |
| 2019/0088009 A1 | 3/2019 | Forey et al. | |
| 2019/0163527 A1* | 5/2019 | Acharya | G06T 1/20 |
| 2020/0065095 A1* | 2/2020 | Underwood | G06F 9/3842 |

OTHER PUBLICATIONS

Uhrenholt, "Graphics Processing Systems," U.S. Appl. No. 16/931,731, filed Jul. 17, 2020.
Uhrenholt, "Graphics Processors," U.S. Appl. No. 16/931,754, filed Jul. 17, 2020.
Non-Final Office Action dated Apr. 15, 2021, U.S. Appl. No. 16/931,731.
Response to Non-Final Office Action dated Jul. 15, 2021, U.S. Appl. No. 16/931,731.
Notice of Allowance dated Aug. 9, 2021, U.S. Appl. No. 16/931,731.

* cited by examiner

*Primary Examiner* — Jacinta M Crawford
(74) *Attorney, Agent, or Firm* — Vierra Magen Marcus LLP

(57) ABSTRACT

To suspend the processing of primitives in a graphics processing pipeline the graphics processor selects a suspend operation "boundary" primitive having a position within a sequence of graphics primitives being processed such that it can be guaranteed that all primitives in the sequence of primitives that are behind the position of the selected boundary primitive within the sequence of primitives are in their initial specified order, whereas any primitives in the sequence of primitives that may be out of order are ahead of the selected boundary primitive. The processing of primitives behind the boundary primitive is then stopped, whereas processing for primitives ahead of boundary primitive is continued.

17 Claims, 3 Drawing Sheets

SUSPENDING AND RESUMING OPERATIONS IN GRAPHICS PROCESSING SYSTEMS

BACKGROUND

The technology described herein relates to the operation of graphics processors, and in particular to the suspending and resuming of graphics processing operations on a graphics processor.

Graphics processing is normally carried out by first dividing the graphics processing (render) output to be rendered, such as a frame to be displayed, into a number of similar basic components (so-called graphics "primitives") to allow the graphics processing operations to be more easily carried out. These "primitives" are usually in the form of simple polygons, such as triangles.

Each primitive is at this stage defined by and represented as a set of vertices. Each vertex for a primitive has associated with it a set of data (such as position, colour, texture and other attributes data) representing the vertex. This "vertex data" is then used, e.g., when rasterising and rendering the primitive(s) to which the vertex relates in order to generate the desired render output of the graphics processing system.

For a given output, e.g. frame to be displayed, to be generated by the graphics processing system, there will typically be a set of vertices defined for the output in question. The primitives to be processed for the output will then be indicated as comprising given vertices in the set of vertices for the graphics processing output being generated.

Once primitives and their vertices have been generated and defined (i.e. the primitive assembly operations are complete), the assembled primitives can be processed by the graphics processing system, in order to generate the desired graphics processing output (render output), such as a frame for display. This basically involves determining which sampling points of an array of sampling points associated with the render output area to be processed are covered by a primitive, and then determining the appearance each sampling point should have (e.g. in terms of its colour, etc.) to represent the primitive at that sampling point. These processes are commonly referred to as rasterising and rendering, respectively.

The rasterising process determines the sample positions that should be used for a primitive (i.e. the (x, y) positions of the sample points to be used to represent the primitive in the output, e.g. scene to be displayed). This is typically done using the positions of the vertices of a primitive. The rendering process then derives the data, such as red, green and blue (RGB) colour values and an "Alpha" (transparency) value, necessary to represent the primitive at the sample points (i.e. "shades" each sample point). This can involve, for example, applying textures, blending sample point data values, etc. (The term "rasterisation" is sometimes used to mean both primitive conversion to sample positions and rendering. However, herein "rasterisation" will be used to refer to converting primitive data to sampling point addresses only.)

These processes are typically carried out by testing sets of one, or of more than one, sampling point, and then generating for each set of sampling points found to include a sample point that is inside (covered by) the primitive in question (being tested), a discrete graphical entity usually referred to as a "fragment" on which the graphics processing operations (such as rendering) are carried out. Covered sampling points are thus, in effect, processed as fragments that will be used to render the primitive at the sampling points in question. The "fragments" are the graphical entities that pass through the rendering process (the rendering pipeline). Each fragment that is generated and processed may, e.g., represent a single sampling point or a set of plural sampling points, depending upon how the graphics processing system is configured.

A "fragment" is therefore effectively (has associated with it) a set of primitive data as interpolated to a given output space sample point or points of a primitive. It may also include per-primitive and other state data that is required to shade the primitive at the sample point (fragment position) in question.

Each graphics fragment may typically be the same size and location as a "pixel" of the output (e.g. output frame) (since as the pixels are the singularities in the final display, there may be a one-to-one mapping between the "fragments" the graphics processor operates on (renders) and the pixels of a display). However, it can be the case that there is not a one-to-one correspondence between a fragment and a display pixel, for example where particular forms of post-processing, such as downsampling, are carried out on the rendered image prior to displaying the final image.

It is also the case that as multiple fragments, e.g. from different overlapping primitives, at a given location may affect each other (e.g. due to transparency and/or blending), the final pixel output may depend upon plural or all fragments at that pixel location.

Correspondingly, there may be a one-to-one correspondence between the sampling points and the pixels of a display, but more typically there may not be a one-to-one correspondence between sampling points and display pixels, as downsampling may be carried out on the rendered sample values to generate the output pixel values for displaying the final image. Similarly, where multiple sampling point values, e.g. from different overlapping primitives, at a given location affect each other (e.g. due to transparency and/or blending), the final pixel output will also depend upon plural overlapping sample values at that pixel location.

One form of graphics processing uses so-called "tile-based" rendering. In tile-based rendering, the two-dimensional render output (i.e. the output of the rendering process, such as an output frame to be displayed) is rendered as a plurality of smaller area regions, usually referred to as "tiles". In such arrangements, the render output is typically sub-divided (by area) into regularly-sized and shaped tiles (they are usually e.g., squares or rectangles).

This sub-division may be performed over multiple levels. For instance, the overall render output (e.g. frame) may initially be divided into a first set of tiles (which may be referred to as "metatiles", each covering a portion of the area of the overall render output, with the size of these metatiles being specified, e.g., by the application requiring the graphics processing), with the tiles in the first set of tiles then being further sub-divided at the graphics processor into smaller area rendering tiles, e.g. with the size of the rendering tiles determined based on the size of the graphics processor's available buffers, to further facilitate the rendering process.

In this way, a given processing task issued to the graphics processor, e.g. rendering one of the larger metatiles specified by an application, can be effectively broken down by the graphics processor into a number of smaller tasks (e.g. rendering the respective, smaller area rendering tiles) which tasks are then typically worked through in sequence.

(Other terms that are commonly used for "tiling" and "tile-based" rendering include "chunking" (the rendering tiles are referred to as "chunks") and "bucket" rendering.

The terms "tile" and "tiling" will be used hereinafter for convenience, but it should be understood that these terms are intended to encompass any and all alternative and equivalent terms and techniques wherein the render output is rendered as a plurality of smaller area regions.)

The advantage of such tile-based rendering is that primitives that do not appear in a given tile do not have to be processed for that tile, and therefore can be ignored when the tile is processed. This can allow the overall amount of graphics processing necessary for a given render output to be reduced.

In a tile-based rendering system, it is accordingly usually desirable to be able to identify and know those primitives that are actually present in a given region of the render output (which region may, e.g., represent a tile into which the overall render output has been divided into, or a set of multiple of such tiles), so as to, e.g., avoid unnecessarily rendering primitives that are not actually present in a region. In order to facilitate this, it is known to prepare lists of the primitives to be rendered for different regions of the render output (e.g. that will appear in the different regions of the render output). Such "primitive lists" identify, e.g. by reference to a primitive indicator, the primitives to be rendered for each region of the render output in question.

The process of preparing the primitive lists for regions of the render output basically therefore involves determining the primitives that should be rendered for a given region. This process is usually carried out by determining (at a desired level of accuracy) the primitives that intersect (i.e. that will appear (at least in part) within) the region in question, and then preparing a list of those primitives for future use by the graphics processing system. (It should be noted here that where a primitive falls into more than one region, as will frequently be the case, it is included in the primitive list for each region that it falls within.)

In effect, each region can be considered to have a bin (the primitive list) into which any primitive that is found to fall within (i.e. intersect) the region is placed (and, indeed, the process of sorting the primitives on a region-by-region basis in this manner is commonly referred to as "binning").

Thus, in a tile-based processing system there will be an initial, first processing pass which, in effect, sorts the graphics primitives (and/or other graphics entities, geometry, etc.) to be processed into regions that the render output has been divided into for sorting purposes. To do this, the graphics processor typically executes and implements a "tiling" pipeline.

The tiling pipeline executes the required geometry-related processing ("tiling") operations for preparing the primitive lists, such as obtaining vertex data for the primitives, vertex shading, bounding, binning, and so on. Once all of the primitives for the render output have been processed in this way, i.e. the tiling is complete, the graphics processor can then write the prepared primitive lists out (e.g. back to memory), so that the primitive lists can then be used to identify the primitives to be rendered for each tile when generating the desired render output, e.g. to display the frame.

The tiles are then rendered separately, typically one after another, in a second, deferred processing pass.

The rendering of each tile is generally performed by reading in an ordered sequence of primitives for the tile identified from the respective primitive list(s) for that tile and then performing the required graphics processing on the sequence of primitives to render the tile.

The rendering of a (and each) tile is typically also performed in a "pipelined" fashion. The graphics processor thus typically implements and executes a graphics processing pipeline (which may also be referred to as a rendering pipeline) including a sequence of processing stages for processing the primitives to generate a render output for the tile.

For instance, in the graphics processing pipeline for a tile-based system, for each tile that is to be rendered, a primitive list reader at the input of the graphics processing pipeline can identify from the respective primitive list(s) for the tile a sequence of primitives that are to be rendered for the tile. The sequence of primitives for the current tile is then issued into the graphics processing pipeline in an order specified by the primitive list(s) (which is typically the desired primitive draw order).

Once a sequence of primitives for a tile has entered the graphics processing pipeline, the primitives in the sequence then pass along the graphics processing pipeline, from each processing stage to the next, to thereby generate the render output.

For example, a primitive read in by the primitive list reader may typically first be subject to any required primitive assembly operations, before the assembled primitive is then passed along the graphics processing pipeline to suitable rasterising/rendering stages that act to perform the desired rasterisation/rendering of the primitive to generate rendered fragment data for the render output, e.g. in the manner described above.

To generate a given render output (or region thereof) the graphics processor works through all of the tiles to be rendered for the render output (region) in question, with the respective sequence(s) of primitives to be rendered for each rendering tile (processing task) being passed into the graphics processing pipeline, and rendered, in turn.

The rendered tiles are then recombined to provide the complete render output (e.g. a frame, or a portion of a frame, for display).

Once all of the tiles for a given render output (region) have been rendered, the generation of that render output is then complete, and the graphics processor may then move on, e.g., to start generating a different render output.

However, there may be instances where the generation of a given render output has to be suspended before it can complete.

For instance, it is becoming increasingly common for graphics processors to be used in data processing systems in which the graphics processor is, in effect, shared between multiple applications running concurrently. For example, this can arise in data processing systems that support hardware virtualisation using time-slicing, in which a given graphics processor may be performing graphics processing for multiple applications that are executing concurrently in a virtualised environment, with the graphics processor being shared between the different applications in a time division-based manner.

In this case, the graphics processor may be generating a render output for a first application, but then be required to switch to producing a render output for another application before it has completed the first render output. In that case therefore, the graphics processor will be required to suspend its processing of the first render output, so as to be able to switch to generating the second render output, but in such a way that it can then subsequently resume the processing of the first render output when the graphics processor returns to performing processing for the application that requires the first render output. This process will be repeated over time, as the graphics processor switches between generating render outputs for different applications that are "sharing" the graphics processor in the time division-based manner.

The Applicants accordingly believe that there is a need for an improved mechanism for suspending processing of a given render output on the graphics processor in such a way that the processing of the render output can then be resumed at a later date, and desirably in an efficient and relatively quick (in a low latency) manner.

BRIEF DESCRIPTION OF THE DRAWINGS

Various embodiments of the technology described herein will now be described by way of example only and with reference to the accompanying drawings, in which.

Like reference numerals are used for like components where appropriate in the drawings.

DETAILED DESCRIPTION

Figure 1:
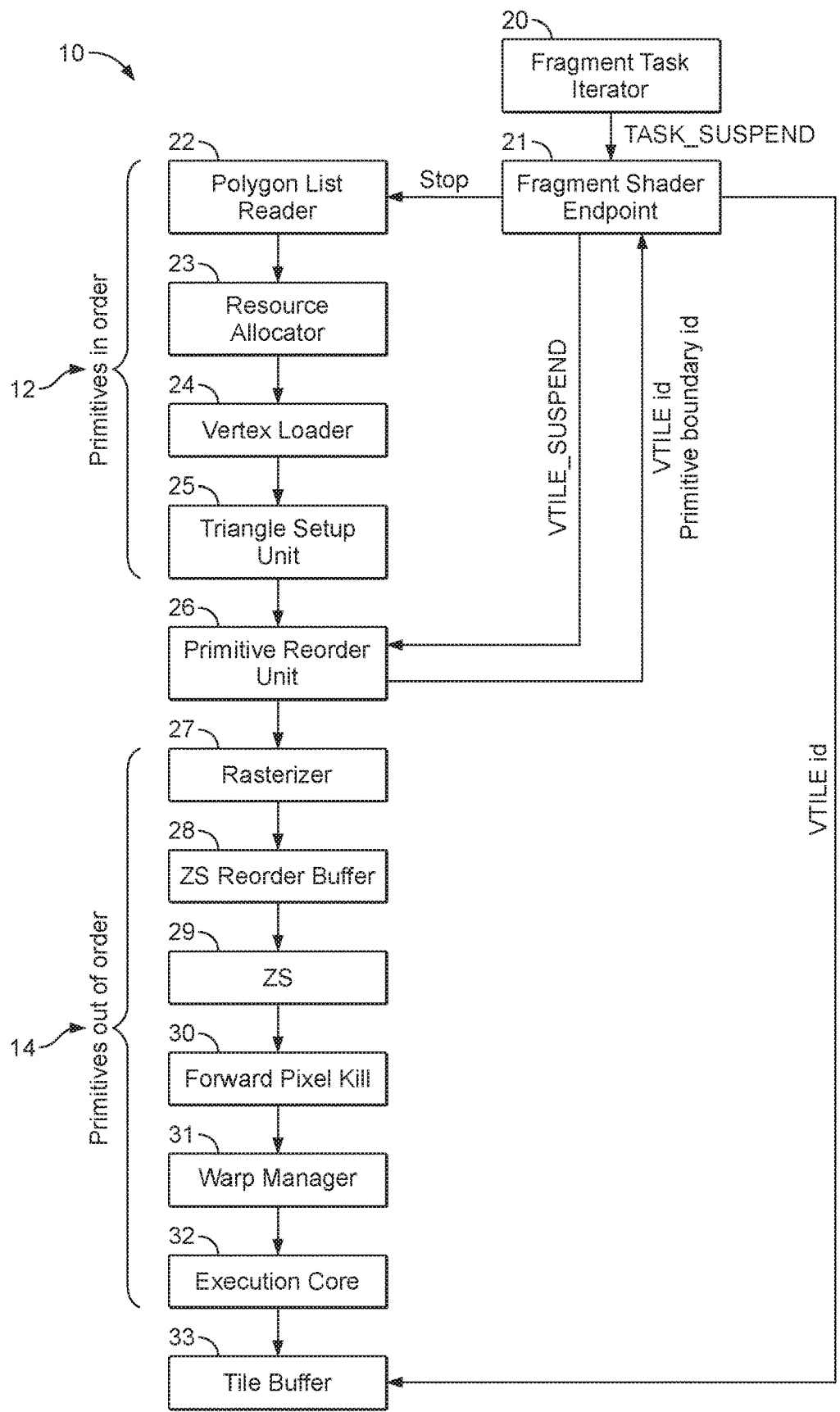
FIG. 1 shows an exemplary graphics processing pipeline within which the technology described herein may be implemented.

A first embodiment of the technology described herein comprises a method of operating a graphics processor, wherein the graphics processor executes a graphics processing pipeline that is operable to process graphics primitives to generate a render output, the graphics processing pipeline comprising, in sequence:

a first section in which graphics primitives are processed strictly in the order in which they were initially issued into the graphics processing pipeline; and a second section including one or more graphics processing circuits that operate on graphics primitives input to the second section of the graphics processing pipeline from the first section to generate from each of the graphics primitives input to the second section a respective set of one or more graphics fragments to be rendered for the render output, wherein primitives in the second section of the graphics processing pipeline may be processed out of the order in which they were initially issued into the graphics processing pipeline; and a rendering circuit operable to render graphics fragments generated by the second section of the graphics processing pipeline to generate rendered fragment data for the render output, the method comprising:

in response to a command to suspend processing of a first render output being generated by the graphics processor:

the graphics processor stopping issuing any new primitives associated with the first render output into the graphics processing pipeline; and for a sequence of graphics primitives for the first render output that is currently being processed in the graphics processing pipeline:

selecting within the sequence of graphics primitives currently being processed in the graphics processing pipeline a suspend operation "boundary" primitive having a position within the sequence of primitives such that it can be guaranteed that all primitives in the sequence of primitives that are behind the position of the selected boundary primitive within the sequence of primitives are currently in the first section of the graphics processing pipeline, and are thus in order, whereas any primitives in the sequence of primitives that are currently in the second section of the graphics processing pipeline, and that may thus be out of order, are ahead of the selected boundary primitive;

stopping the processing of any graphics primitives in the sequence of graphics primitives that are behind the selected boundary primitive;

continuing the processing of graphics primitives in the graphics processing pipeline that are ahead of the selected boundary primitive to generate from those primitives rendered fragment data for the first render output; and once the processing of graphics primitives that are ahead of the selected boundary primitive is completed:

writing out the current rendered fragment data generated from the processing of the graphics primitives in the sequence of graphics primitives for the first render output, together with data identifying the position of the selected boundary primitive within the sequence of primitives for the first render output such that the graphics processor can identify the position of the boundary primitive within the sequence of primitives for the first render output when processing of the first render output is resumed.

A second embodiment of the technology described herein comprises a graphics processor, wherein the graphics processor comprises a plurality of processing circuits configured to execute a graphics processing pipeline that is operable to process graphics primitives to generate a render output, the graphics processing pipeline comprising, in sequence:

a first section in which graphics primitives are processed strictly in the order in which they were initially issued into the graphics processing pipeline;

a second section including one or more graphics processing circuits that operate on graphics primitives input to the second section of the graphics processing pipeline from the first section to generate from each of the graphics primitives input to the second section a respective set of one or more graphics fragments to be rendered for the render output, wherein primitives in the second section of the graphics processing pipeline may be processed out of the order in which they were initially issued into the graphics processing pipeline;

a rendering circuit operable to render graphics fragments generated by the second section of the graphics processing pipeline to generate rendered fragment data for the render output; and a control circuit that is configured to operate the graphics processor such that:

in response to a command to suspend processing of a first render output being generated by the graphics processor:

the control circuit causes the graphics processor to stop issuing any new primitives associated with the first render output into the graphics processing pipeline; and for a sequence of graphics primitives for the first render output that is currently being processed in the graphics processing pipeline:

the control circuit stops the processing of any graphics primitives in the sequence of graphics primitives that are behind a selected suspend operation "boundary" primitive having a position within the sequence of primitives such that it can be guaranteed that all primitives in the sequence of primitives that are behind the position of the selected boundary primitive within the sequence of primitives are currently in the first section of the graphics processing pipeline, and are thus in order, whereas any primitives in the sequence of primitives that are currently in the second section of the graphics processing pipeline, and that may thus be out of order, are ahead of the selected boundary primitive;

the control circuit continues the processing of graphics primitives in the graphics processing pipeline that are ahead of the selected boundary primitive to generate from those primitives rendered fragment data for the first render output; and once the processing of graphics primitives that are ahead of the selected boundary primitive is completed, the control circuit causes:

a write-out circuit of the graphics processor writes out the current rendered fragment data generated from the processing of the graphics primitives in the sequence of graphics primitives for the first render output, together with data identifying the position of the selected boundary primitive within the sequence of primitives for the first render output such that the graphics processor can identify the position of the boundary primitive within the sequence of primitives for the first render output when processing of the first render output is resumed.

The technology described herein relates to the processing of graphics primitives when generating a render output. In particular, the technology described herein relates to graphics processing operations in the situation where the generation of a first render output may be stopped, to be resumed at a later time (e.g. because there is a need to switch to generation of a second, different render output).

An example of this situation would be when switching between different applications in a virtualised environment, e.g. as described above, wherein the graphics processor (graphics processing unit (GPU)) is shared between multiple applications running concurrently, with the graphics processor generating respective render outputs for the different applications in an interleaved manner such that it may be required to (repeatedly) suspend/resume the processing of a (and each) render output. However, there are various examples of other situations where it may be desired to be able to suspend, and subsequently resume, the processing of a given render output and the technology described herein may generally find utility in any suitable such situations.

The graphics processor of the technology described herein implements and executes a graphics processing pipeline to perform the required graphics processing. Graphics processing work to be performed may thus be queued for input to the graphics processing pipeline with items of work (processing tasks) typically then being passed to the graphics processing pipeline for execution in sequence, one after another.

A (and each) given processing task that is queued for input to the graphics processing pipeline (which processing task may, e.g., be the rendering of a particular tile from a set of plural tiles into which an overall, larger render output (e.g. a frame) has been divided for rendering purposes) may require processing of a respective sequence of plural graphics primitives. A sequence of graphics primitives associated with the processing task may thus be (and in the technology described herein is) issued to the graphics processing pipeline with the primitives associated with that task being issued into the graphics processing pipeline in a specified order, e.g., and in an embodiment, in a desired draw order for the primitives (although as will be explained below, the graphics primitives may subsequently be re-ordered within the graphics processing pipeline).

The technology described herein relates to the situation where it is desired to suspend graphics processing for a first render output mid-way through a render pass such that at the point at which the processing is suspended the graphics processing pipeline is currently processing a sequence of graphics primitives for the first render output (and wherein there may be further (sequences of) primitives to be processed for the first render output that are queued for execution by the graphics processing pipeline).

In the technology described herein, in response to receiving a command to suspend processing of a render output that is currently being generated, the graphics processor stops (and in an embodiment immediately stops) issuing any new work (primitives) for that render output into the graphics processing pipeline. (For example, whilst embodiments have been described in relation to a single sequence of primitives currently being processed (which may, e.g. represent a single processing task, e.g., for rendering a single tile), it will be appreciated that the graphics processor will generally need to process multiple such sequences of primitives when generating a given render output (e.g. to render all of the tiles covering the area of the render output in question). Thus, in embodiments, the graphics processor has a queue of processing tasks to be completed for the first render output, with each processing task in an embodiment associated with a respective sequence of primitives. For example, in an embodiment, each of the processing tasks represents the rendering of a respective tile. In response to a suspend command being issued the graphics processor thus stops issuing any new processing tasks in the queue to the graphics processing pipeline for processing.)

A task identifier is in an embodiment written out at this point to allow the graphics processor to identify which task (e.g. tile) in the queue of tasks for the first render output the graphics processor was processing at the time at which the processing was suspended, and to allow the graphics processor to resume generation of the first render output from this task.

In this way, the generation of the first render output can be stopped mid-way through a queue of processing tasks for the first render output (e.g. rather than waiting for all of the queued tasks to complete).

However, the technology described herein recognises that in order to perform a relatively quicker (lower latency) suspend operation, it would be further desirable to be able to suspend the processing mid-way through the current processing task for the first render output (i.e. mid-way through a sequence of primitives currently being processed for the first render output), and in particular to be able to suspend the processing of the current processing task, such that it can be resumed at a later point, in an efficient manner (e.g., and whilst limiting the amount of additional data that needs to be written out to subsequently resume processing of the first render output).

The technology described herein thus provides an improved mechanism for suspending (and resuming) processing of a given render output on the graphics processor. This is achieved by selecting from within the sequence of primitives that is currently being processed for the first render output a "boundary" primitive at which the processing of the sequence of primitives can be appropriately suspended (and such that the processing then be resumed from the position of the boundary position), as will be explained further below.

The technology described herein recognises in this regard that the graphics processing pipeline being executed on the graphics processor can be divided into (at least) a first section wherein the primitives are processed strictly in the order in which they were issued into the graphics processing pipeline and a second section wherein at least some of the primitives may be processed out of their initially specified order.

Accordingly, the technology described herein further recognises it is possible to determine within a sequence of primitives currently being processed in a graphics processing pipeline the position of a boundary primitive that represents a point (i.e. primitive) in the sequence of primitives behind which it can be guaranteed that the primitives are still in their initial, specified order (primitives that are still in the first section of the graphics processing pipeline), and that by stopping the processing of the current sequence of primitives in the graphics processing pipeline at the position of the selected boundary primitive a more efficient suspend/resume operation can be provided.

For instance, and in an embodiment, when a sequence of primitives to be processed in the manner of the technology described herein is read into the graphics processing pipeline (which sequence of primitives may correspond to a particular processing task, e.g. rendering a single tile), each of the primitives in the sequence of primitives will initially be subjected to, in a first section of the graphics processing pipeline, various primitive assembly operations (which may, and in embodiments do, include, e.g., vertex loading, primitive set-up, etc., operations). During such primitive assembly, the primitives are processed strictly in the order in which they were initially issued into the graphics processing pipeline. For example, in a tile-based system, this will be the order in which the primitives for a tile are read out from the respective primitive list(s) for the tile.

In embodiments the primitives are issued to the graphics processing pipeline, and initially processed, in a desired primitive draw order. However, other arrangements for initially ordering the primitives would also be possible.

After the primitive set-up for a primitive in the first section of the graphics processing pipeline is complete, the assembled primitive may then be, and in an embodiment is, passed on to a rasteriser circuit in the next section of the graphics processing pipeline. The rasteriser circuit generates from the assembled primitives respective sets of one or more graphics fragments for rendering. The rasteriser (rasteriser circuit) can be configured to operate in any suitable and desired manner. For example, the rasteriser may generally operate to generate graphics fragments for processing in dependence upon which sampling points (or which sets of sampling points) of an array of sampling points covering the area of the render output, a given primitive, etc., received by the rasteriser covers (at least in part).

The rasteriser could in principle continue to process the graphics primitives strictly according to their initial order. However, it may be desirable for processing efficiency to be able to re-order at least some of the graphics primitives at this point (and, in an embodiment of the technology described herein, this is done). To this end, the graphics processing pipeline may, and in an embodiment does, include, e.g., a primitive re-order buffer, or other suitable mechanism for re-ordering the primitives between the first section of the graphics processing pipeline and the rasteriser (in the second section of the graphics processing pipeline).

Thus, in embodiments, the graphics processing pipeline includes a primitive re-ordering circuit. The primitive re-ordering circuit thus defines a re-ordering point within the graphics processing pipeline that, in effect, delimits the first and second sections of the graphics processing pipeline. That is, the first section of the graphics processing pipeline in an embodiment extends up to the last point in the graphics processing pipeline where the primitives are guaranteed to still be in their initial order, i.e. up to the re-ordering point within the primitive re-ordering circuit.

The re-ordering circuit may be provided in the form of a primitive re-order buffer. The primitive re-order buffer will contain a list of primitives, some of which have not yet been processed by the primitive re-ordering circuit (and so are still in order) and some of which have been processed by the primitive re-ordering circuit (and so are potentially out of order, although it may be the case that after processing in the primitive re-ordering circuit some of the primitives are still in order). It is thus possible to determine within the primitive re-order buffer the last point (i.e. primitive) at which the primitives are guaranteed to be in order such that beyond this point it can no longer be ensured that the graphics primitives are in their initially specified order. The re-ordering point thus defines the start of a second section of the graphics processing pipeline wherein it can no longer be guaranteed that primitives are still in the initial, specified order.

Thus, in an embodiment, in response to a command to suspend processing of the current render output, a request can be (and is) issued to the primitive re-ordering circuit to return the position of the boundary primitive. That is, in embodiments, the graphics processing pipeline includes a primitive re-ordering circuit, and the selected boundary primitive is a primitive in the primitive re-ordering circuit that is guaranteed to still be the initial order, and wherein in response to receiving a command to suspend processing of the first render output, the primitive re-ordering circuit returns a primitive identifier for the selected boundary primitive. Once the position of the boundary primitive has been returned to the graphics processor, the graphics processor then operates as described above.

In an embodiment the primitive that is selected as the boundary primitive is the last primitive in the sequence of primitives that is guaranteed to still be in its initially specified order (and for which any processing of the selected primitive so far has in an embodiment not generated any observable effects for the render output, as will be explained below). In an embodiment, this will be the last primitive in the primitive re-ordering circuit (buffer) that has not yet been subject to potential re-ordering. That is, in an embodiment, the boundary primitive is selected based on the last primitive at the last point in the graphics processing pipeline where it can be guaranteed that the primitives are still in their initial order (and in an embodiment that have not yet produced any observable output).

Selecting the boundary primitive as the last primitive that is guaranteed to still be in its initial order may provide the maximum benefit in terms of suspend latency. However, other arrangements for selecting the boundary primitive would be possible; for example, the boundary primitive could in principle be set further back in the primitive sequence than this (in which case there may be some primitives ahead of the selected boundary primitive that are still in the first section of the graphics processing pipeline, and that might therefore continue to be processed even though it would have been possible using the techniques described herein to stop processing them immediately).

Thus, in the technology described herein, when it is desired for the graphics processor to suspend the generation of a first render output, a boundary primitive is selected from within the sequence of primitives currently being processed for the first render output such that any primitives that lie behind the position of the selected boundary primitive in the sequence of primitives (i.e. such that they are behind the boundary primitive in the graphics processing pipeline) currently being processed in the graphics processing pipeline can be (and are) discarded without any further processing (with the processing of the discarded primitives then being started again from the beginning when the generation of the first render output is to be resumed).

Accordingly, in the technology described herein, the processing of any primitives that are behind the selected boundary primitive in the sequence of primitives is stopped (in an embodiment immediately) when a suspend command is received, and any processing of these primitives thus far is in an embodiment discarded (such that it needs to be, and is, performed again from the beginning when processing is resumed).

On the other hand, for primitives in the sequence of primitives currently being processed in the graphics processing pipeline that, at the point at which the processing is suspended, lie ahead of the selected boundary primitive (and in an embodiment for all such primitives, although this need not be the case and it would be possible for the processing of some of the primitives ahead of the boundary primitive to also be stopped), the processing is allowed to complete before the graphics processor suspends processing of the first render output (e.g., and in an embodiment, before the graphics processor starts to process a second, different render output).

These primitives therefore continue to pass through the graphics processing pipeline to the rendering circuit, and are rendered accordingly, to generate (or update) the rendered fragment data for the first render output.

The processing of the selected boundary primitive itself can also be, and in an embodiment is, stopped (since the boundary primitive is in an embodiment selected such that it is the last point at which the primitives are still in order, e.g. as described above), and the processing of the first render output can therefore (and should be) resumed from the position of the boundary primitive. However, the selected boundary primitive itself could continue to be processed, in which case the graphics processor should then resume from the position of the next primitive behind the selected boundary primitive in the sequence of primitives for the first render output.

Because the technology described herein stops the further processing of any primitives in the sequence of primitives behind the selected boundary primitive the suspend latency, i.e. the delay between the command to suspend processing of the first render output being received, and the generation of the first render output actually being suspended (e.g. the point at which the graphics processor is able to start processing a different render output), can be reduced (e.g. as compared to waiting for the processing of all of the primitives associated with the current task or tasks to complete, as might be the case in other graphics processing systems).

On the other hand, primitives that are further ahead in the graphics processing pipeline than the selected boundary primitive are allowed to complete their processing before the generation of the first render output is suspended (e.g. and before the graphics processor starts generating a different render output). These primitives are therefore rendered, and once the processing of these primitives is complete the current rendered fragment data (values) generated for the first render output so far is then written out to storage, e.g., and in an embodiment, to an appropriate ("suspend") buffer, from which it can be restored when processing is resumed.

In this way the amount of data that needs to be written out when suspending the generation of the first render output in order to be able to resume processing of the first render output can be reduced and/or the resume operation can be simplified.

In particular, by allowing the processing of these primitives to complete, this means that these primitives do not need to processed again (when processing is resumed), and therefore also means that there is no need to save out any intermediate state or other data (e.g. data for tracking the progress and/or order of these primitives) that may (otherwise) be required to resume processing of these (e.g. if the processing of the first render output was to be stopped immediately).

Furthermore, because the processing of these primitives is allowed to complete, such that these do not need to processed again, when the generation of the first render output is subsequently resumed, the graphics processor can effectively 'fast forward' to the selected boundary primitive and resume processing from that point (since it knows that the processing for any primitives further ahead in the sequence was allowed to complete before the processing was suspended).

To facilitate resuming processing of the first render output from the selected boundary primitive, when the generation of the first render output is suspended, data identifying the boundary primitive is written out together with the current rendered fragment data.

The data identifying the boundary primitive is in an embodiment in the form of a primitive identifier uniquely identifying the boundary primitive. It will be appreciated that writing out this data can therefore be done relatively cheaply. For example, each of the primitives may typically have an associated, e.g., 32-bit, primitive identifier that can be used to uniquely identify the position of the boundary primitive within the current sequence of primitives. When processing is to be resumed, the graphics processor can thus easily identify the position of the boundary primitive by reading this data (e.g. the primitive identifier) and can then resume processing from the appropriate position, e.g. the next primitive (after the boundary primitive) in the sequence of primitives to be processed.

In an embodiment the data identifying the position of the boundary primitive is also written out to the (same) suspend buffer as the current rendered fragment data for the first render output, such that this data can all be read back in on resume from the same place. Other arrangements for storing this data would however of course be possible.

Thus, it will be appreciated from the above that the technology described herein may provide a more efficient and lower latency mechanism for suspending (and subsequently resuming) the processing of a given render output.

As a further aspect of this, the technology described herein also recognises that it is desirable, e.g. in order to be able to more safely and efficiently resume processing of the primitives, for the boundary primitive to be selected such that any primitives in the sequence of primitives currently being processed for the first render output that lie behind the selected boundary primitive have not yet produced any observable effects for the first render output (and in embodiments this is therefore done).

In this way, it can be ensured that the processing of these primitives can be safely started again from the beginning without risking any of the repeated processing for these primitives on resumption of generating the first render output introducing any artefacts into the first render output (e.g. and without having to write out any additional data to track any potential observable effects).

Thus, in embodiments, the processing of graphics primitives in the first section of the graphics processing pipeline does not produce any observable effects for the render output. For example, it will be appreciated that the processing (e.g. primitive assembly) of the primitives in the first section described for the embodiments above does not produce any observable effects for the final render output. Accordingly, the boundary primitive is in embodiments further selected such that the processing of graphics primitives in the sequence of graphics primitives for the first render output that lie behind the position of the selected boundary primitive in the sequence of graphics primitives has not yet produced any observable effects for the first render output, such that the processing of any graphics primitives in the first section of the graphics processing pipeline can be safely repeated from the beginning without introducing artefacts into the first render output.

On the other hand, the rasterisation in the second section of the graphics processing pipeline following the primitive re-ordering may start to produce observable effects for the final render output (although it may of course still be the case that the processing for a particular primitive in the second section does not in fact produce any observable effects). Thus, in embodiments, the processing of a graphics primitive in the second section of the graphics processing pipeline may produce an observable effect for the render output (and in an embodiment the position of the boundary primitive is selected accordingly).

In other words, in embodiments, the boundary primitive is selected such that it can be guaranteed that all primitives in the sequence of primitives that are behind the position of the selected boundary primitive are currently in the first section of the graphics processing pipeline, and are thus in order and have not yet produced any observable effects for the render output, whereas any primitives in the sequence of primitives that are currently in the second section of the graphics processing pipeline, and that might therefore have produced an observable effect for the render output, are ahead of the selected boundary primitive.

The boundary primitive is thus in an embodiment selected such that any primitives lying behind the selected boundary primitive are not only guaranteed to still be in the initial, specified order, but also have not yet produced any observable output. This ensures that the processing of these primitives can be safely started again from the beginning without risking introducing any artefacts in the render output, and without, e.g., requiring additional data to be stored and/or complex tracking mechanisms for tracking the primitive order.

In this way, any and all primitives whose current processing can simply be discarded, and that can be safely processed again from the beginning without introducing observable artefacts in the render output (i.e. any primitives currently in the first section of the graphics processing pipeline) can be discarded when the processing is suspended in the manner described above, thereby providing a particularly efficient suspend operation.

On the other hand, it will be appreciated that any primitives in the primitive sequence that are ahead of the selected boundary primitive would not be able to safely resume without also, e.g., saving out all of the intermediate state data that would be required to continue processing those primitives (if they were stopped immediately), and so, in the technology described herein, the processing of these primitives is allowed to complete.

As explained above, once the processing of the primitives that are ahead of the selected boundary primitive is complete, the resulting rendered fragment data (e.g. colour, depth, etc., values) generated by the continued processing of any primitives that are ahead of the boundary primitive (and any primitives already processed) is then written out.

In an embodiment the resulting rendered fragment generated by the partial generation of the first render output (up to the point at which the processing was suspended) is written out to an appropriate "suspend" buffer from which it can be re-loaded as/when required.

In embodiments, this suspend buffer may be stored intermediate between the graphics processor and the (e.g. main) memory system of an overall data processing system to which the graphics processor belongs, e.g. such that the data written out at the point of suspending the generation of the render output can be held (cached) relatively locally to the graphics processor to facilitate faster re-loading of the data. However other arrangements would be possible and the suspend buffer may be stored in any suitable portion of the memory system (which may be a portion of main memory, or a suitable cache system, etc.).

It can be seen that the technology described herein therefore provides improved mechanisms for suspending (and resuming) graphics processing operations.

The technology described herein can be used in and with any suitable and desired graphics processing system and processor.

However, the technology described herein is particularly suitable for use with tiled renderers (tile-based graphics processing systems). Thus, in an embodiment, the graphics processor (processing pipeline) is a tiled-based graphics processor (processing pipeline).

Correspondingly, the technology described herein can be used for any form of output that a graphics processing system (tile-based, or otherwise) may be used to generate. In an embodiment it is used when a graphics processing system is being used to generate images for display, but it can be used for any other form of graphics processing output that a graphics processing system may produce, as desired.

The render output(s) to be generated may thus comprise any render output that is to be generated by the graphics processor. Thus it may, and in an embodiment does comprise, for example, a tile to be generated in a tile-based graphics processor, and/or all or part of a frame of output fragment data.

As explained above, the graphics processing pipeline in the technology described herein is divided into first and second sections. Graphics primitives are issued into first section, and processed thereby, before being passed into the second section.

The first section of the graphics processing pipeline may include any suitable processing stages (circuits) that a graphics processing pipeline may have, so long as the processing stages (circuits) are configured to process the primitives in their initial specified order, and in an embodiment so long as the processing does not produce any observable effects for the render output.

For example, the first section of the graphics processing pipeline in an embodiment includes, in sequence, a resource allocator, a vertex shader and a primitive set-up stage (circuit). The first section thus, as described above, in an embodiment performs various primitive assembly operations that generate and define the primitives and their vertices such that the primitives can subsequently be rasterised/rendered.

In embodiments where the graphics processor is a tile-based system, the first section in an embodiment also includes a primitive list reader that reads in a respective, ordered sequence of primitives to be processed for the current processing task (i.e. tile, or sub-tile, that is to be rendered). This is in an embodiment the first stage of the first section of the graphics processing pipeline.

Of course, the first section need not include each of these stages, and/or may include any other suitable stages that might be present in this section of the graphics processing pipeline (so long as the primitives are processed in order and in an embodiment so long as no observable effects are produced).

The second section of the graphics processing pipeline in an embodiment includes one or more fixed-function processing circuits. For example, in an embodiment, the second section includes a rasterisation circuit, as described above, as well as primitive culling stages (circuits) such as a depth (or depth and stencil) tester(s), etc. In an embodiment some or all of the stages in the second section of the graphics processing pipeline is implemented in hardware as a fixed-function unit. However, other arrangements would be possible.

Thus, in embodiments, after the processing of the graphics primitives to generate fragments (by the rasteriser), the fragments may then be culled, e.g. by depth testing, etc., operations, in order to reduce number of fragments that are passed to the renderer circuit, e.g. to avoid unnecessary rendering.

The result of the processing in the second section is therefore to generate a set of fragments that are to be rendered to generate the render output.

Any graphics fragments remaining after the processing so far in the second section are then passed to a rendering circuit, which performs the required fragment shading to generate the rendered fragment data (e.g. in the form of colour, depth, etc., values for the fragments).

The renderer (renderer circuit) of the graphics processor should be operable to render (shade) graphics fragments it receives to generate the desired output graphics fragment data. It may contain any suitable and desired rendering elements and may be configured in any suitable and desired manner.

Thus, for example, it may comprise a fixed-function rendering pipeline, including one or more fixed function rendering stages (circuits), such as texture mappers, blenders, fogging units, downsampling units, etc.

However, in an embodiment the renderer comprises a fragment shader (a shader pipeline) (i.e. a programmable processing circuit that is operable to and that can be programmed to carry out fragment shading programs on fragments in order to render them).

The result of this shading, i.e. the rendered fragment data (e.g. colour, depth, etc., values) is in an embodiment then stored in appropriate buffers from which it can ultimately be written out, e.g. to a frame buffer for display. Thus, in embodiments, the renderer will process the fragments it receives to then generate output rendered fragment data, which rendered fragment data is then in an embodiment written to an output buffer, such as a frame buffer, in an embodiment in external memory, for use (e.g. to display a frame on a display). The rendered fragment data may be written to the (external) output buffer via an intermediate buffer, such as a tile (e.g. colour) buffer (as will be the case in a tile-based graphics processing system).

The tile buffers store fragment colour, etc., values to be applied to the render output and can be configured in any appropriate and desired manner. The tile buffers should, and in an embodiment do, store a colour, etc. value for each sampling position of the render output (e.g. tile) that is being generated. Thus the tile buffer for a tile should, and in an embodiment does, store a current colour, etc., value for each sampling position within the tile in question. The colour, etc. values stored in the tile buffers should be, and are in an embodiment, stored and updated as primitives are rasterised/rendered to generate new fragment output data.

In an embodiment, a depth value for an output fragment is also written appropriately to a depth (Z) buffer within the tile buffers. For instance in an embodiment, the second section of the graphics processing pipeline includes an (early) depth testing circuit that is operable to perform an (early) depth test on fragments generated by the rasteriser. To do this, the (early) depth testing circuit in an embodiment compares the depth value of (associated with) a fragment received at the (early) depth testing circuit with depth values of graphics fragments that have already been rendered to determine whether the new fragments will be occluded by fragments that have already been rendered (or not). These depth values are stored in a depth (Z) buffer that is part of the tile buffers and the depth values stored in the depth buffer should be, and are in an embodiment, stored and updated as primitives are processed.

At the same time, an early stencil test is in an embodiment carried out. In this case, fragments may also have an associated stencil value that can be tested against a respective set of, e.g. stencil function, values, which may in an embodiment take the form of minimum and maximum stencil vales. Similarly to the depth values, the stencil values may also be stored in a suitable buffer, and in an embodiment updated on the basis of the stencil test. In an embodiment, the graphics processing pipeline comprises a combined early depth/stencil testing circuit.

If it is determined by the (early) depth/stencil testing that a fragment would be occluded by a fragment that has already been rendered, there is then no need to render the fragment, and this is therefore in an embodiment not done (and the fragment can then be discarded, or "culled"). This can help to avoid sending fragments that are occluded by already processed primitives through the rendering pipeline. In this way, it is possible to reduce the amount of "overdraw", i.e. to avoid performing multiple, ultimately redundant, rendering operations for a given sampling point (e.g. when a first received and rendered primitive is subsequently covered by a later primitive, such that the rendered first primitive is not in fact seen at the sampling point(s)) in question).

As explained above, in the technology described herein, when the generation of a given render output is suspended, the current tile buffer(s) are in an embodiment written into a suitable suspend buffer, and held there until generation of the render output is resumed.

In addition to what has been described above, the graphics processing unit (processor) (processing pipeline) can include, and in an embodiment does include, any one or more, and in an embodiment all, of the processing stages that a graphics processor (processing pipeline) can normally include.

In particular, where the graphics processor is tile-based, graphics processor may also implement and execute a tiling pipeline for generating the primitive lists. Thus, whilst embodiments are described above in relation to the rendering of primitives to generate a given render output, which rendering is in an embodiment performed using a set of previously generated primitive lists, the graphics processor is in an embodiment also operable to perform (e.g. in an earlier processing pass) the tiling operations for generating the primitive lists.

Thus, in general, the graphics processor (processing pipeline) may also contain any other suitable and desired processing stages that a graphics processing pipeline may contain such as a hull shader, a tessellation stage (e.g. where tessellation is performed by executing a shader program), a domain (evaluation) shading stage (shader), a geometry shading stage (shader), a fragment shader, a blender, a write out unit etc.

In normal operation of the graphics processor, when generating a first render output, the primitives pass through the graphics processing pipeline, and the resulting rendered fragment data is stored, e.g. in the tile buffers. When the processing for the first render output is complete, the rendered fragment data can then be suitably written out, e.g., to a frame buffer, e.g. for display.

The technology described herein however relates particularly to the operation of the graphics processor when a command to suspend processing for a render output is received, such that the generation of the render output is interrupted (and generation of the render output cannot (yet) be completed).

As discussed above, such a requirement to suspend processing of a current render output can arise, e.g., in the case where the graphics processor is being shared between multiple different applications that require graphics processing, e.g. on a time division basis. In this case, the time "slice" for generating a render output for a first application may expire before the render output is completed, such that the graphics processor will need to suspend processing of that render output and switch to processing a different render output, but then be able to resume processing of the first render output when the next time "slice" for that render output occurs.

The overall suspend operation itself can be instigated in any suitable and desired manner and by any suitable and desired component of the overall data processing system that the graphics processor is part of. In an embodiment, the suspend operation will be triggered by some overall controller or control process, that is controlling the sharing of the graphics processor between the different applications, etc. In the case of a virtualised hardware arrangement, then the suspend operation is in an embodiment initiated by the appropriate overall controller for the virtualised hardware, such as a hypervisor.

In an embodiment, the signal (the suspend command) that is sent to the graphics processor is sent by an appropriate driver of (for) the graphics processor, e.g. that is executing on a host processor of the overall data processing system that the graphics processor is part of. In this case therefore, the driver will, e.g., receive a suspend command from an overall controller, e.g. hypervisor, of the data processing system, with the driver then in response to that issuing a corresponding suspend command to the graphics processor. In the case of a virtualised hardware environment, there may be multiple drivers controlling their respective operations on the graphics processor, in which case, the overall suspend command will be sent to the driver whose particular graphics processing operation is to be suspended, with that driver then correspondingly signalling the graphics processor to suspend the processing for that driver.

In an embodiment, in order to facilitate the waiting for any outstanding processing for primitives ahead of the selected boundary primitive to complete, the suspending of the processing for the render output being generated is performed by and under the control of the driver for the graphics processor for that render output, so that the driver is permitted to retain control of the graphics processor until the suspend operation has been completed (in contrast, e.g. to the driver being forced to relinquish control of the graphics processor (and the graphics processor being forcibly switched to start processing a different render output) when the suspend command is received).

This will then avoid the graphics processor being switched to generating a different render output, before the suspend operation in the manner of the technology described herein has been completed. (In these arrangements, a "backstop", default timeout operation may be implemented, such that the graphics processor will still be forced to switch to generating a different render output if the suspend operation has not been completed within a particular, in an embodiment selected, in an embodiment predetermined time period (e.g. number of cycles), so as to allow render output switching in any event, even if the suspend operation for some reason fails to complete successfully.) (In this case, the render output generation that was forcibly suspended can then be handled in an appropriate manner on resumption of processing for that render output, for example by simply assuming that the generation of the render output failed and restarting the generation of the render output from the beginning. Other "error case" handling arrangements could, of course, be used, if desired.)

Correspondingly, when a suspend operation is initiated, the graphics processor is in an embodiment configured to and allowed to clean up its state, service any page faults and/or perform cache maintenance operations, before yielding control of the graphics processor to start generating the new render output. Again, this then facilitates "clean" switching of the graphics processor between generating different render outputs, whilst facilitating more efficient and "clean" resumption of the processing of the render output at a later time.

Thus, in an embodiment, where the technology described herein is being used in a virtualised system, the technology described herein is used in a virtualised system that operates according to "collaborative virtualisation" principles.

It will be appreciated that in the technology described herein the generation of a first render output is in an embodiment suspended in order to allow the graphics processor to start (or resume) generating a second render output. Thus, in embodiments, a suspend command is issued to the graphics processor when it is desired to switch from generating a first render output to generating a second, different render output.

Thus, in embodiments, the method comprises: operating the graphics processor to generate a first render output; in response to receiving a command to suspend generation of the first render output, suspending the generation of the first render output in the manner described above; and then once the generation of the first render output has been suspended, operating the graphics processor to generate a second render output. The method in an embodiment comprises, at a later point, suspending generation of the second render output.

In one embodiment, once the second render output is suspended, the graphics processor then resumes processing of the first render output. However, there may be more than two different render outputs being generated in a time-shared manner, and so the graphics processor may, e.g., suspend generating the second render output and start generating a third (or further) render output before resuming the first render output. The division of the graphics processor resource between the different render outputs is in an embodiment determined by an overall controller, such as a hypervisor, as explained above. Further, the switching is in an embodiment performed such that the graphics processor is allowed to finish the suspend operations for the first render output before control is relinquished to another application to start generating a second render output.

The above describes the operation when graphics processing that is generating a given render output is to be suspended. It will be appreciated from the above, that when graphics processing is suspended in the manner of the technology described herein, there will be a need to, and the intention is that, the graphics processing is resumed at a later time. The technology described herein also extends to the corresponding operation of resuming graphics processing that has previously been suspended in the manner of the technology described herein.

The resume operation should be, and is in an embodiment, the reverse (the inverse) of the suspend operation (and flow).

Thus, the graphics processor will receive a resume command, which, inter alia, indicates which graphics processing operation (render output generation) (graphics processing context) is to be resumed. The graphics processor will then identify by reference to the boundary primitive the processing that still needs to be done for the processing operation that is to be resumed, and resume and complete (unless the processing is suspended again) that processing accordingly.

In particular, in response to receiving a resume command, the graphics processor can then load the rendered fragment data so far (and that was written out into the suspend buffer) into the relevant buffers, together with the data identifying the boundary primitive. The graphics processor then knows that all primitives behind boundary primitive need to be (and can safely be) processed again (from the beginning), and so can fast-forward to the position of the boundary primitive in the primitive sequence when resuming processing.

Thus, in embodiments, the method further comprises (at a later time after the graphics processor has stopped generating the first render output) the graphics processor receiving a command to resume processing of the first render output, and in response to receiving a command to resume processing of the first render output: the graphics processor loading back in the rendered fragment data generated from the processing of the graphics primitives in the sequence of graphics primitives for the first render output that was completed at the point at which the processing of the first render output was suspended (and that was therefore written out when processing of the first render output was suspended), together with the data identifying the position of the selected suspend operation boundary primitive within the sequence of primitives for the first render output; and the graphics processor resuming processing of primitives in the sequence of primitives from a position (primitive) based on the position of the boundary primitive to continue generating the first render output.

The graphics processor is thus in an embodiment configured to determine the position of the boundary primitive at which processing of the first render output was suspended, and then resume processing accordingly from a position based on the position of the boundary primitive (which may, e.g., be the next primitive in the sequence of primitives in the case that the processing of the boundary primitive itself is allowed to complete when processing is suspended, or may be the position of the boundary primitive itself in the case that the processing of the boundary primitive was suspended). Thus, when processing for the first render output is resumed, any primitives in the sequence of primitives that are behind the selected boundary primitive in the sequence of primitives for the first render output are issued into the graphics processing pipeline as normal, and processed from the beginning (as if they were new primitives).

On the other hand, for any primitives that lie ahead of the selected boundary primitive within the sequence of primitives, it is known that the processing has already completed (since the boundary primitive is selected on this basis). These primitives do not need to be processed again on resume, and in an embodiment this is therefore not done. An input circuit of the graphics processing pipeline, which in an embodiment may, e.g., comprise the primitive list reader (where present), is able to determine based on the position of the selected boundary primitive the first primitive to be issued into the graphics processing pipeline for rendering. Thus, the graphics processor is operable to, in effect, 'fast forward' to the boundary primitive, and then issue the primitives after the position of the boundary primitive to the graphics processing pipeline. This therefore provides a more efficient (quicker) resume operation.

The generation of the first render output can in an embodiment also be resumed from the processing task (e.g. tile) at which the processing was suspended, without having to process all of the tasks again from the beginning. For example, in embodiments, the graphics processor has a queue of processing tasks to be completed for the first render output, with each processing task in an embodiment associated with a respective sequence of primitives, and a task identifier is in an embodiment written out when processing is suspended identifying which task (e.g. tile) in the queue of tasks for the first render output the graphics processor was processing at the time at which the processing was suspended. When processing of the first render output is resumed, the graphics processor can thus identify using the task identifier the processing task that was suspended and to resume processing of the first render output accordingly.

It is believed that this resume operation is novel and advantageous in its own right.

A further embodiment of the technology described herein comprises a method of operating a graphics processor, wherein the graphics processor executes a graphics processing pipeline that is operable to process graphics primitives to generate a render output, the graphics processing pipeline comprising, in sequence:

a first section in which graphics primitives are processed strictly in the order in which they were initially issued into the graphics processing pipeline; and a second section including one or more graphics processing circuits that operate on graphics primitives input to the second section of the graphics processing pipeline from the first section to generate from each of the graphics primitives input to the second section a respective set of one or more graphics fragments to be rendered for the render output, wherein primitives in the second section of the graphics processing pipeline may be processed out of the order in which they were initially issued into the graphics processing pipeline; and a rendering circuit operable to render graphics fragments generated by the one or more graphics processing circuits to generate rendered fragment data for the render output, the method comprising:

in response to a command to resume generation of a first render output that was previously suspended:

the graphics processor loading back in rendered fragment data generated from the processing of the graphics primitives in the sequence of graphics primitives for the first render output that was written out when the processing of the first render output was suspended, together with data identifying the position of a suspend operation boundary primitive within the sequence of primitives for the first render output at which point the processing of the sequence of primitives for the first render output was suspended; and the graphics processor resuming processing of primitives in the sequence of primitives for the first render output from a position based on the position of the boundary primitive to continue generating the first render output.

A further embodiment of the technology described herein comprises a graphics processor, wherein the graphics processor comprises a plurality of processing circuits configured to execute a graphics processing pipeline that is operable to process graphics primitives to generate a render output, the graphics processing pipeline comprising, in sequence:

a first section in which graphics primitives are processed strictly in the order in which they were initially issued into the graphics processing pipeline;

a second section including one or more graphics processing circuits that operate on graphics primitives input to the second section of the graphics processing pipeline from the first section to generate from each of the graphics primitives input to the second section a respective set of one or more graphics fragments to be rendered for the render output, wherein primitives in the second section of the graphics processing pipeline may be processed out of the order in which they were initially issued into the graphics processing pipeline;

a rendering circuit operable to render graphics fragments generated by the one or more graphics processing circuits to generate rendered fragment data for the render output; and a control circuit that is configured to operate the graphics processor such that:

in response to a command to resume processing of a first render output for which the processing was previously suspended:

the control circuit causes the graphics processor to load back in rendered fragment data generated from the processing of the graphics primitives in the sequence of graphics primitives for the first render output that was written out when the processing of the first render output was suspended, together with data identifying the position of a suspend operation boundary primitive within the sequence of primitives for the first render output at which point the processing of the sequence of primitives for the first render output was suspended; and the control circuit causes the graphics processor to resume processing of primitives in the sequence of primitives for the first render output from a position based on the position of the boundary primitive to continue generating the first render output.

It will be appreciated that the technology described herein also extends to an overall method and corresponding system for suspending and subsequently resuming the generation of a given (first) render output.

A further embodiment of the technology described herein comprises a method of operating a graphics processor, wherein the graphics processor executes a graphics processing pipeline that is operable to process graphics primitives to generate a render output, the graphics processing pipeline comprising, in sequence:

a first section in which graphics primitives are processed strictly in the order in which they were initially issued into the graphics processing pipeline; and a second section including one or more graphics processing circuits that operate on graphics primitives input to the second section of the graphics processing pipeline from the first section to generate from each of the graphics primitives input to the second section a respective set of one or more graphics fragments to be rendered for the render output, wherein primitives in the second section of the graphics processing pipeline may be processed out of the order in which they were initially issued into the graphics processing pipeline; and a rendering circuit operable to render graphics fragments generated by the one or more graphics processing circuits to generate rendered fragment data for the render output, the method comprising:

in response to a command to suspend processing of a first render output being generated by the graphics processor:

the graphics processor stopping issuing any new primitives associated with the first render output into the graphics processing pipeline; and for a sequence of graphics primitives for the first render output that is currently being processed in the graphics processing pipeline:

selecting within the sequence of graphics primitives currently being processed in the graphics processing pipeline a suspend operation "boundary" primitive having a position within the sequence of primitives such that it can be guaranteed that all primitives in the sequence of primitives that are behind the position of the selected boundary primitive within the sequence of primitives are currently in the first section of the graphics processing pipeline, and are thus in order, whereas any primitives in the sequence of primitives that are currently in the second section of the graphics processing pipeline, and that may thus be out of order, are ahead of the selected boundary primitive;

stopping the processing of any graphics primitives in the sequence of graphics primitives that are behind the selected boundary primitive;

continuing the processing of graphics primitives in the graphics processing pipeline that are ahead of the selected boundary primitive to generate from those primitives rendered fragment data for the first render output; and once the processing of graphics primitives that are ahead of the selected boundary primitive is completed:

writing out the current rendered fragment data generated from the processing of the graphics primitives in the sequence of graphics primitives for the first render output, together with data identifying the position of the selected boundary primitive within the sequence of primitives for the first render output such that the graphics processor can identify the position of the boundary primitive within the sequence of primitives for the first render output when processing of the first render output is resumed;

the method further comprising:

in response to a command to resume processing of the first render output:

the graphics processor loading back in the rendered fragment data generated from the processing of the graphics primitives in the sequence of graphics primitives for the first render output that was written out when the processing of the first render output was suspended, together with the data identifying the position of the selected suspend operation boundary primitive within the sequence of primitives for the first render output; and the graphics processor resuming processing of primitives in the sequence of primitives for the first render output from a position based on the position of the boundary primitive to continue generating the first render output.

Another embodiment of the technology described herein comprises a graphics processor, wherein the graphics processor comprises a plurality of processing circuits configured to execute a graphics processing pipeline that is operable to process graphics primitives to generate a render output, the graphics processing pipeline comprising, in sequence:

a first section in which graphics primitives are processed strictly in the order in which they were initially issued into the graphics processing pipeline;

a second section including one or more graphics processing circuits that operate on graphics primitives input to the second section of the graphics processing pipeline from the first section to generate from each of the graphics primitives input to the second section a respective set of one or more graphics fragments to be rendered for the render output, wherein primitives in the second section of the graphics processing pipeline may be processed out of the order in which they were initially issued into the graphics processing pipeline;

a rendering circuit operable to render graphics fragments generated by the one or more graphics processing circuits to generate rendered fragment data for the render output; and a control circuit that is configured to operate the graphics processor such that:

in response to a command to suspend processing of a first render output being generated by the graphics processor:

the control circuit causes the graphics processor to stop issuing any new primitives associated with the first render output into the graphics processing pipeline; and for a sequence of graphics primitives for the first render output that is currently being processed in the graphics processing pipeline:

the control circuit stops the processing of any graphics primitives in the sequence of graphics primitives that are behind a selected suspend operation "boundary" primitive having a position within the sequence of primitives such that it can be guaranteed that all primitives in the sequence of primitives that are behind the position of the selected boundary primitive within the sequence of primitives are currently in the first section of the graphics processing pipeline, and are thus in order, whereas any primitives in the sequence of primitives that are currently in the second section of the graphics processing pipeline, and that may thus be out of order, are ahead of the selected boundary primitive;

the control circuit continues the processing of graphics primitives in the graphics processing pipeline that are ahead of the selected boundary primitive to generate from those primitives rendered fragment data for the first render output; and once the processing of graphics primitives that are ahead of the selected boundary primitive is completed, the control circuit causes:

a write-out circuit of the graphics processor writes out the current rendered fragment data generated from the processing of the graphics primitives in the sequence of graphics primitives for the first render output, together with data identifying the position of the selected boundary primitive within the sequence of primitives for the first render output such that the graphics processor can identify the position of the boundary primitive within the sequence of primitives for the first render output when processing of the first render output is resumed;

the control circuit further configured to operate the graphics processor such that:

in response to a command to resume processing of the first render output:

the control circuit causes the graphics processor to load back in the rendered fragment data generated from the processing of the graphics primitives in the sequence of graphics primitives for the first render output that was written out when the processing of the first render output was suspended, together with the data identifying the position of the selected suspend operation boundary primitive within the sequence of primitives for the first render output; and the control circuit causes the graphics processor to resume processing of primitives in the sequence of primitives for the first render output from a position based on the position of the boundary primitive to continue generating the first render output.

As will be appreciated from the above, the technology described herein is in an embodiment implemented in a system comprising a memory system and a graphics processing unit (GPU) (a graphics processor). Data for a render output (e.g. image to be displayed) is in an embodiment stored in a memory of the memory system. The GPU is in an embodiment arranged to read required data from the memory system for generating the render output (e.g. in the manner described above). The render output, once generated in this way, is then in an embodiment displayed, e.g. on a display such as a screen or the like.

In an embodiment, the graphics processing system includes a host processor that executes applications that can require graphics processing by the graphics processing unit (processor). The system in an embodiment further includes appropriate storage (e.g. memory), caches, etc., as described above.

The graphics processing system and/or processor in an embodiment also comprises, and/or is in communication with, one or more memories and/or memory devices that store the data described herein, and/or that store software for performing the processes described herein. The graphics processing system and/or processor may also be in communication with a host microprocessor, and/or with a display for displaying images based on the data generated by the graphics processor (processing pipeline).

In an embodiment, the various functions of the technology described herein are carried out on a single graphics processing platform that generates and outputs the rendered fragment data that is, e.g., written to the frame buffer for the display device.

The technology described herein can be implemented in any suitable system, such as a suitably configured microprocessor based system. In some embodiments, the technology described herein is implemented in computer and/or micro-processor based system.

The various functions of the technology described herein can be carried out in any desired and suitable manner. For example, unless otherwise specified, the functions of the technology described herein can be implemented in hardware or software, as desired. Thus, for example, the various functional elements and stages of the technology described herein may comprise a suitable processor or processors, controller or controllers, functional units, circuits/circuitry, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, etc., if desired.

Furthermore, unless otherwise specified, any one or more or all of the processing stages of the technology described herein may be embodied as processing stage circuits/circuitry, e.g., in the form of one or more fixed-function units (hardware) (processing circuits/circuitry), and/or in the form of programmable processing circuits/circuitry that can be programmed to perform the desired operation. Equally, any one or more of the processing stages and processing stage circuits/circuitry of the technology described herein may be provided as a separate circuit element to any one or more of the other processing stages or processing stage circuits/circuitry, and/or any one or more or all of the processing stages and processing stage circuits/circuitry may be at least partially formed of shared processing circuits/circuitry.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. It will thus be seen that when viewed from further embodiments the technology described herein comprises computer software specifically adapted to carry out the methods herein described when installed a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments will now be described in the context of a graphics processing system.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, their associated data values are then stored in memory, ready for output, e.g. for display.

In the present embodiments, graphics processing is carried out in a pipelined fashion, with one or more pipeline stages operating on the data to generate the final render output, e.g. frame that is displayed.

FIG. 1 shows an exemplary graphics processing pipeline 10 that may be executed by a graphics processor. The graphics processing pipeline 10 shown in FIG. 1 is a tile-based system, and will thus produce tiles of a render output data array, such as an output frame to be generated. (The technology described herein is however also applicable to other systems, such as immediate mode rendering systems.) The output data array may typically be an output frame intended for display on a display device, such as a screen or printer, but may also, for example, comprise a "render to texture" output of the graphics processor, or other suitable arrangement.

FIG. 1 shows the main elements and pipeline stages of the graphics processing pipeline according to the present embodiments. As will be appreciated by those skilled in the art, there may be other elements of the graphics processing pipeline that are not illustrated in FIG. 1. It should also be noted here that FIG. 1 is only schematic, and that, for example, in practice the shown functional units and pipeline stages may share significant hardware circuits, even though they are shown schematically as separate stages in FIG. 1. Equally, some of the elements depicted in FIG. 1 need not be provided, and FIG. 1 merely shows one example of a graphics processing pipeline 10. It will also be appreciated that each of the stages, elements and units, etc., of the graphics processing pipeline as shown in FIG. 1 may be implemented as desired and will accordingly comprise, e.g., appropriate circuits and/or processing logic, etc., for performing the necessary operation and functions.

The graphics processing pipeline as illustrated in FIG. 1 will be executed on and implemented by an appropriate graphics processing unit (GPU) (graphics processor) that includes the necessary functional units, processing circuits, etc., operable to execute the graphics processing pipeline stages.

In order to control a graphics processor (graphics processing unit) that is implementing a graphics processing pipeline to perform the desired graphics processing operations, the graphics processor will typically receive commands and data from a driver, e.g. executing on a host processor, that indicates to the graphics processor the operations that it is to carry out and the data to be used for those operations.

The graphics processor may include a tiler (not shown) for preparing primitive lists. The tiler in effect determines which primitives need to be processed for different regions of the render output. In the present embodiments, these regions may, e.g., represent a tile into which the overall render output has been divided into for processing purposes, or a set of multiple such tiles. To do this, the tiler compares the location of each primitive to be processed with the positions of the regions, and adds the primitive to a respective primitive list for each region that it determines the primitive could (potentially) fall within. Any suitable and desired technique for sorting and binning primitives into tile lists, such as exact binning, or bounding box binning or anything in between, can be used for the tiling process.

Once the tiler has completed the preparation of the primitive lists (lists of primitives to be processed for each region), then each tile can be rendered with reference to its associated primitive list(s).

To do this, each tile is processed by the graphics processing pipeline stages shown in FIG. 1.

A fragment task iterator 20 is thus provided that schedules processing work to the graphics processing pipeline 10.

The fragment task iterator 20 may thus schedule the graphics processing pipeline to generate a first render output, which may, e.g. be a frame to display. In the present embodiments, wherein the graphics processing pipeline 10 is a tile-based system, in which the render output has been divided into a plurality of rendering tiles, the graphics processing pipeline 10 iterates over the set of tiles for the first render output, rendering each tile in turn.

For a given tile that is being processed, a primitive list reader (or 'polygon list reader') 22 thus identifies a sequence of primitives to be processed for that tile (the primitives that are listed in the primitive list(s) for that tile), and an ordered sequence of primitives for the tile is then issued into the graphics processing pipeline 10 for processing.

A resource allocator 23 then configures and manages the allocation of memory space for the depth (Z), colour, etc., buffers for the render output. These buffers may, e.g., be provided as part of RAM that is located on (local to) the graphics processing pipeline (chip).

A vertex loader 24 then loads in the vertices for the primitives, which are then passed into a primitive set-up unit (or 'triangle set-up unit') 25 that operates to determine, from the vertices for the primitives, edge information representing the primitive edges.

Up to this point, the primitives are processed strictly in the order in which they were initially issued into the graphics processing pipeline 10. Furthermore, the processing so far has not yet produced any observable effects for the render output (such that the processing could be repeated from the beginning without risking introducing any artefacts in the render output by repeating the processing).

These stages thus define a 'first section' 12 of the graphics processing pipeline 10 in which it can be guaranteed that the primitives are still in their initial order, and have not yet produced any observable effects for the render output.

Before the primitives are passed to the rasteriser 27 the primitives may desirably be re-ordered, e.g. to improve the rasterisation efficiency, hidden surface removal, etc. Thus, the graphics processing pipeline 10 includes a primitive re-order unit 26 containing a buffer of primitives that may be subject to re-ordering.

Beyond this point, it can therefore no longer be guaranteed that the primitives are still in their initial specified order. Further, the rasterisation may start to produce observable effects for the render output.

The stages of the graphics processing pipeline following the primitive re-ordering thus define a 'second section' 14 of the graphics processing pipeline in which it can no longer be ensured that the primitives are in order, and in which the processing may have produced observable effects for the render output (such that repeating this processing may start to introduce artefacts into the render output).

The edge information for the re-ordered primitives is then passed to the rasteriser 27, which rasterises the primitives into a set of one or more sampling points and generates from the primitives individual graphics fragments having appropriate positions (representing appropriate sampling positions) for rendering the primitive.

The fragments generated by the rasteriser 27 are then sent onwards to the rest of the pipeline for processing.

For instance, in the present embodiments, the fragments generated by the rasteriser 27 are subject to (early) depth (Z)/stencil testing 29, to see if any fragments can be discarded (culled) at this stage. To do this, the Z/stencil testing stage 29 compares the depth values of (associated with) fragments issuing from the rasteriser 27 with the depth values of fragments that have already been rendered (these depth values are stored in a depth (Z) buffer that is part of the tile buffer 33) to determine whether the new fragments will be occluded by fragments that have already been rendered (or not). At the same time, an early stencil test is carried out.

To facilitate this, the fragments may be subject to further re-ordering in a ZS re-order buffer 28 upstream of the Z/stencil testing stage 29.

Fragments that pass the fragment early Z and stencil test stage 29 may then be subject to further culling operations, such as a 'forward pixel kill' test 30, e.g. as described in United States Patent Application Publication No. 2019/0088009 (Arm Limited), before the remaining fragments are then passed to a fragment shading stage for rendering.

The fragment shading stage performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data.

In the present embodiment, the fragment shading stage is in the form of a shader pipeline (a programmable fragment shader). Thus, as shown in FIG. 1, in the present embodiment, the shader pipeline includes an execution core 32 operable to execute fragment shader programs for respective execution threads (where each thread corresponds to one work item, e.g. an individual fragment, for the render output being generated) to perform the required fragment shading operations to thereby generate rendered fragment data. The execution core 32 can operate in any suitable and desired manner in this regard and comprise any suitable and desired processing circuits, etc.

In the present embodiments, the execution threads may be arranged into "groups" or "bundles" of threads, where the threads of one group are run in lockstep, one instruction at a time, i.e. each thread in the group executes the same single instruction before moving onto the next instruction. In this way, it is possible to share instruction fetch and scheduling resources between all the threads in a group. Such thread groups may also be referred to as "sub-groups", "warps" and "wavefronts". For convenience the term thread group will be used herein, but this is intended to encompass all equivalent terms and arrangements, unless otherwise indicated.

FIG. 1 accordingly also shows a warp manager 31 that is configured to control the allocation of work items (fragments) to respective thread groups for the fragment shading operations performed by the execution core, and for scheduling the issuing of thread groups to the execution core and the execution of the fragment shading programs by respective thread groups.

Once the fragment shading is complete, the output rendered (shaded) fragment data is written to the tile buffer 33 from where it can, for example, be output to a frame buffer for display. The depth value for an output fragment is also written appropriately to a Z-buffer within the tile buffer 33. (The tile buffer stores colour and depth buffers that store an appropriate colour, etc., or Z-value, respectively, for each sampling point that the buffers represent (in essence for each sampling point of a rendering tile that is being processed).) These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

As mentioned above, the tile buffer 33 is normally provided as part of RAM that is located on (local to) the graphics processing pipeline (chip).

Once a tile for the render output has been processed, the data from the tile buffer(s) may thus be written back to an external memory output buffer, such as a frame buffer of a display device (not shown). (The display device could comprise, e.g., a display comprising an array of pixels, such as a computer monitor or a printer.)

The next tile is then processed, and so on, until sufficient tiles have been processed to generate the entire render output (e.g. frame (image) to be displayed). The process is then repeated for the next render output (e.g. frame) and so on.

The present embodiments, however, relate to the situation where the generation of a first render output is suspended before it can complete, e.g. to generate a second, different render output.

For example, this may be the case when the graphics processor is being shared between multiple concurrently running applications such that the graphics processor may need to repeatedly switch between generating different render outputs for the respective, different applications.

In this case, as shown in FIG. 1, when it is desired to switch between render outputs, the fragment task iterator 20 issues a command ("TASK SUSPEND") to suspend processing of the current render output. This may, e.g., be in response to a command to suspend processing the current render output received from the driver that is controlling the graphics processor to generate that render output.

Figure 2:
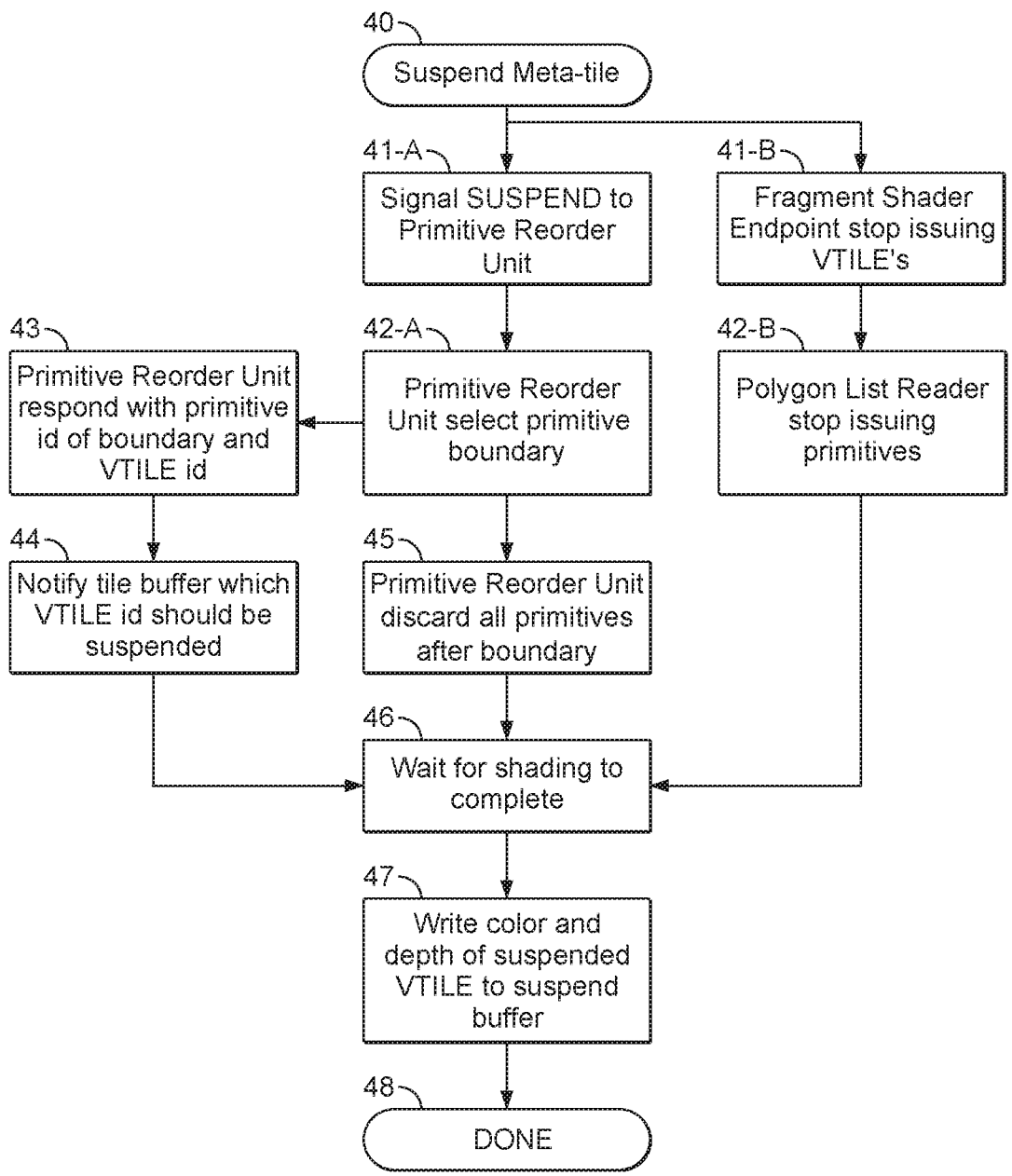
FIG. 2 shows the overall data flow when a suspend command is issued.

The suspend operation according to the present embodiments is illustrated schematically in FIG. 2.

Thus, in response to a command to suspend generation of a first render output (which in the present embodiments represents a "metatile", the metatile covering an area of the overall render output, e.g., frame to be displayed, with the size of the metatile specified by the application requiring the graphics processing, and with the metatile being subdivided at the graphics processor into a number of smaller area rendering tiles (also referred to as "virtual tiles")) (step 40), a controller for the fragment shading operation, the fragment shader endpoint 21 stops issuing any new (virtual/rendering) tiles to the graphics processing pipeline 10 for rendering (step 41-B), and the primitive list reader 22 accordingly stops issuing any new primitives (step 42-B).

At the same time, the suspend operation is signalled to the primitive re-order unit 26 (step 41-A), which then determines a suitable suspend operation boundary primitive (step 42-A) at which to suspend the current sequence of primitives.

In particular, in the present embodiments, the selected boundary primitive is the last primitive in the primitive re-order unit 26 that is guaranteed to still be in order, and for which the processing thus far has not produce any observable effects for the render output.

The primitive re-order unit 26 then responds with a primitive identifier ("primitive_id") identifying the position of the selected boundary primitive within the sequence of primitives for the rendering tile that is currently being processed, as well as a tile identifier ("VTILE_id") identifying the tile in question (step 43). The tile buffer 33 is then notified which tile is to be suspended (step 44).

The primitive re-order unit 26 can then (and does) discard all primitives in the sequence of primitives for the tile that are behind the selected boundary primitive (i.e. that are earlier in the pipeline than the selected boundary primitive) (step 45).

However, the processing of any primitives in the sequence that are ahead of the selected boundary primitive, and that are therefore further ahead in the graphics processing pipeline, is continued.

Once the processing, e.g. shading, of such primitives is completed (step 46), the current (updated) rendered fragment data (e.g. colour, depth, etc., values) for the tile that was suspended is then written out to a suitable suspend buffer, together with data identifying the selected primitive boundary (e.g., the primitive_id) and the tile identifier (VTILE_id) (step 47).

The generation of the first render output can then be suspended such that the graphics processor can start generating a different render output (step 48).

When processing of the first render output is to be resumed, essentially the reverse operation is performed.

Figure 3:
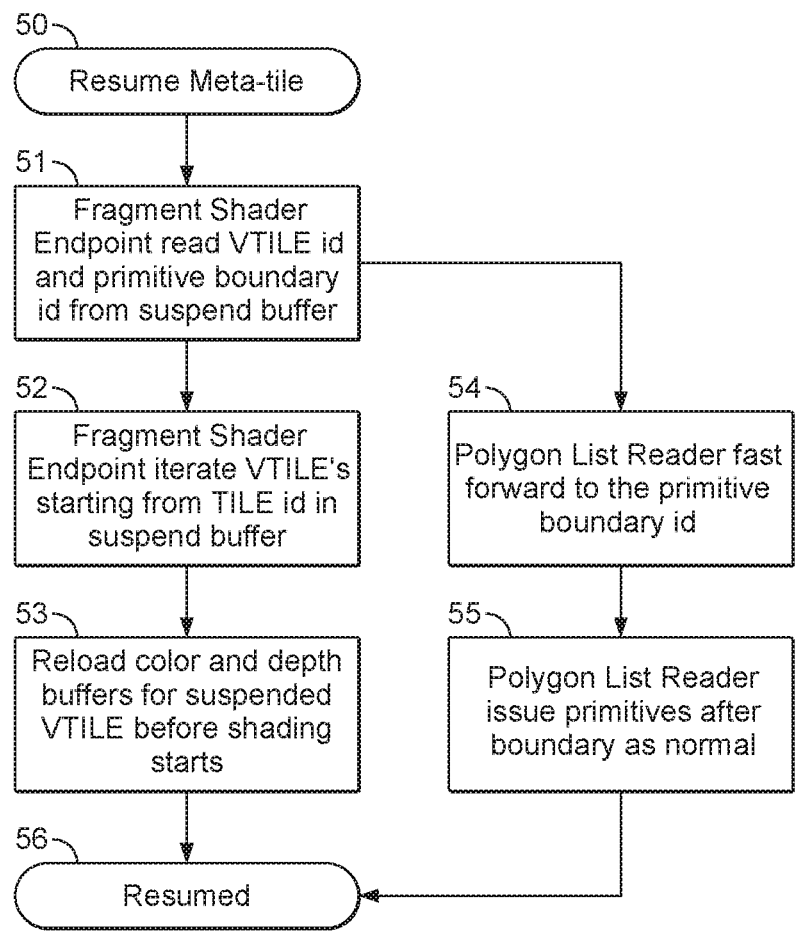
FIG. 3 shows the overall data flow when a resume command is issued.

The resume operation according to the present embodiment is illustrated in FIG. 3.

Thus, when it is desired to resume processing of a first render output (i.e. a given metatile, in the present embodiments) that was previously suspended, a command to resume generation of the first render output is issued to graphics processor (step 50).

In response to receiving this resume command, the controller for the fragment shading operation, the fragment shader endpoint 21, reads in data identifying the tile (VTILE_id) and the selected boundary primitive within the sequence of primitives for that tile (primitive_id) at which point the processing of the first render output was suspended (step 51).

The fragment shader endpoint 21 can then resume processing for the identified rendering tile (step 52) for which the processing was suspended. At this point, the tile (colour, depth, etc.) buffer(s) for the identified tile that were written out to the suspend buffer when the processing was suspended are re-loaded (step 53).

Correspondingly, and in parallel with this, the primitive list reader 26 is able to fast-forward through the sequence of primitives for the tile to the boundary primitive (step 54), and then issue primitives for the tile in question starting from the primitive after the boundary primitive (the first primitive for which processing was suspended and not completed) (step 55).

Figure 4:
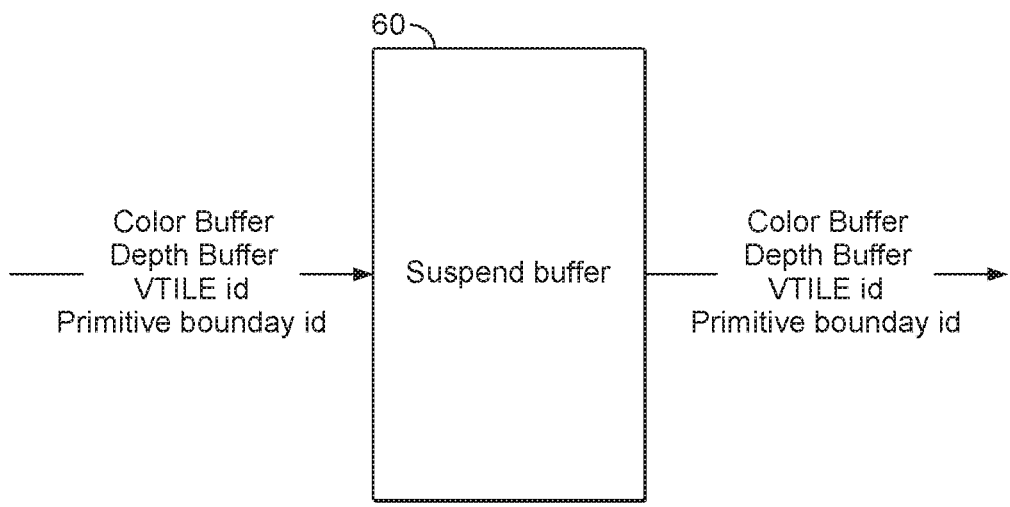
FIG. 4 shows the data flow to and from a suspend buffer during such suspend/resume operations.

The processing can then resume accordingly from the positon at which it was suspended (step 56), without having to repeat any of the processing for primitives that lie ahead of the boundary primitive, and for which the processing was therefore completed as part of the suspend operation FIG. 4 thus shows the overall data flow during such suspend/resume operations. As shown, when processing of a given tile for a first render output is suspended, the current values for the tile buffer(s) for the tile generated from the processing so far of primitives for the tile (including primitives for the tile already rendered at the point of suspension, as well as primitives that lie ahead of the selected boundary primitive and for which processing is allowed to complete) are written out into a suspend buffer 60, together with the data identifying the tile in question (VTILE_id) for which processing is suspended, and the data identifying the position of the boundary primitive within the sequence of primitives for the tile (primitive_id).

This data is then re-loaded when processing is resumed, to allow the graphics processor to efficiently resume processing from the position of the boundary primitive for the tile in question for which processing was suspended as shown in FIG. 3.

In this way, the generation of a given render output can be suspended/resumed, as required, in a relatively quick (low latency) and efficient manner. For instance, when the rendering of a tile is suspended, any primitives that lie behind the selected boundary primitive in the primitive sequence can be safely processed again (since they are in order and have not yet produced any observable effects), and so are discarded, and processed again from the beginning when processing is resumed. On the other hand, any primitives that are ahead of the boundary primitive are allowed to complete their processing. This means that there is no need to save out large amounts of, e.g., intermediate fragment state or other data for tracking the processing of such primitives.

This also means that these primitives do not need to be processed again when processing is resumed since their processing is complete (and the result of this processing is used to update the partial tile buffer(s) written into the suspend buffer) such that on resume the graphics processor can 'fast forward' through the sequence of primitives and resume processing from an appropriate position.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A method of operating a graphics processor, wherein the graphics processor executes a graphics processing pipeline that is operable to process graphics primitives to generate a render output, the graphics processing pipeline comprising, in sequence:
   a first section in which graphics primitives are processed strictly in a first order in which they were initially issued into the graphics processing pipeline; and
   a second section including one or more graphics processing circuits that operate on graphics primitives input to the second section of the graphics processing pipeline from the first section to generate from each of the graphics primitives input to the second section a respective set of one or more graphics fragments to be rendered for the render output, wherein primitives in the second section of the graphics processing pipeline are processed in a second order; and
   a rendering circuit operable to render graphics fragments generated by the one or more graphics processing circuits to generate rendered fragment data for the render output,
   the method comprising:
   in response to a command to suspend processing of a first render output being generated by the graphics processor:
   the graphics processor stopping issuing any new primitives associated with the first render output into the graphics processing pipeline; and
   for a sequence of graphics primitives for the first render output that is currently being processed in the graphics processing pipeline:
      selecting within the sequence of graphics primitives currently being processed in the graphics processing pipeline a suspend operation boundary primitive having a position within the sequence of primitives such that it is guaranteed that all primitives in the sequence of primitives that are behind the position of the selected boundary primitive within the sequence of primitives are currently in the first section of the graphics processing pipeline, and are thus ordered in the first order, whereas any primitives in the sequence of primitives that are currently in the second section of the graphics processing pipeline, and that are ordered in the second order, are ahead of the selected boundary primitive;
      stopping the processing of any graphics primitives in the sequence of graphics primitives that are behind the selected boundary primitive;
      continuing the processing of graphics primitives in the graphics processing pipeline that are ahead of the selected boundary primitive to generate from those primitives rendered fragment data for the first render output; and
      once the processing of graphics primitives that are ahead of the selected boundary primitive is completed:
         writing out the current rendered fragment data generated from the processing of the graphics primitives in the sequence of graphics primitives for the first render output, together with data identifying the position of the selected boundary primitive within the sequence of primitives for the first render output such that the graphics processor is able to identify the position of the boundary primitive within the sequence of primitives for the first render output when processing of the first render output is resumed.

2. The method of claim 1, wherein the boundary primitive is further selected such that the processing of graphics primitives in the sequence of graphics primitives for the first render output that lie behind the position of the selected boundary primitive in the sequence of graphics primitives has not yet produced any observable effects for the first render output, such that repeating the processing of any graphics primitives in the first section of the graphics processing pipeline from the beginning will not introduce artefacts into the first render output.

3. The method of claim 1, wherein the graphics processing pipeline includes a primitive re-ordering circuit, and the selected boundary primitive is a primitive in the primitive re-ordering circuit that is guaranteed to still be the initial order, and wherein in response to receiving a command to suspend processing of the first render output, the primitive re-ordering circuit returns a primitive identifier for the selected boundary primitive.

4. The method of claim 1, wherein the method comprises: after the generation of the first render output has been suspended, operating the graphics processor to generate a second, different render output.

5. The method of claim 1, wherein after the generation of the first render output has been suspended, the method further comprises:
the graphics processor receiving a command to resume processing of the first render output, and in response to receiving a command to resume processing of the first render output:
the graphics processor loading back in the rendered fragment data generated from the processing of the graphics primitives in the sequence of graphics primitives for the first render output that was completed at the point at which the processing of the first render output was suspended, together with the data identifying the position of the selected suspend operation boundary primitive within the sequence of primitives for the first render output; and the graphics processor resuming processing of primitives in the sequence of primitives from a position based on the position of the boundary primitive to continue generating the first render output.

6. The method of claim 1, wherein the graphics processor is a tile-based rendering system, and wherein the first render output is a tile, or set of tiles.

7. A method of operating a graphics processor, wherein the graphics processor executes a graphics processing pipeline that is operable to process graphics primitives to generate a render output, the graphics processing pipeline comprising, in sequence:
a first section in which graphics primitives are processed strictly in a first order in which they were initially issued into the graphics processing pipeline; and
a second section including one or more graphics processing circuits that operate on graphics primitives input to the second section of the graphics processing pipeline from the first section to generate from each of the graphics primitives input to the second section a respective set of one or more graphics fragments to be rendered for the render output, wherein primitives in the second section of the graphics processing pipeline are processed in a second order; and
a rendering circuit operable to render graphics fragments generated by the one or more graphics processing circuits to generate rendered fragment data for the render output,
the method comprising:
in response to a command to resume generation of a first render output that was previously suspended:
the graphics processor loading back in rendered fragment data generated from the processing of the graphics primitives in the sequence of graphics primitives for the first render output that was written out when the processing of the first render output was suspended, together with data identifying the position of a suspend operation boundary primitive within the sequence of primitives for the first render output at which point the processing of the sequence of primitives for the first render output was suspended; and
the graphics processor resuming processing of primitives in the sequence of primitives for the first render output from a position based on the position of the boundary primitive to continue generating the first render output.

8. The method of claim 7, wherein the graphics processor is a tile-based rendering system, and wherein the first render output is a tile, or set of tiles.

9. A non-transitory computer readable storage medium storing computer software which when executing on a processor performs a method of operating a graphics processor, wherein the graphics processor executes a graphics processing pipeline that is operable to process graphics primitives to generate a render output, the graphics processing pipeline comprising, in sequence:
a first section in which graphics primitives are processed strictly in a first order in which they were initially issued into the graphics processing pipeline; and
a second section including one or more graphics processing circuits that operate on graphics primitives input to the second section of the graphics processing pipeline from the first section to generate from each of the graphics primitives input to the second section a respective set of one or more graphics fragments to be rendered for the render output, wherein primitives in the second section of the graphics processing pipeline are processed in a second order; and
a rendering circuit operable to render graphics fragments generated by the one or more graphics processing circuits to generate rendered fragment data for the render output,
the method comprising:
in response to a command to suspend processing of a first render output being generated by the graphics processor:
the graphics processor stopping issuing any new primitives associated with the first render output into the graphics processing pipeline; and
for a sequence of graphics primitives for the first render output that is currently being processed in the graphics processing pipeline:
selecting within the sequence of graphics primitives currently being processed in the graphics processing pipeline a suspend operation boundary primitive having a position within the sequence of primitives such that it is guaranteed that all primitives in the sequence of primitives that are behind the position of the selected boundary primitive within the sequence of primitives are currently in the first section of the graphics processing pipeline, and are thus ordered in the first order, whereas any primitives in the sequence of primitives that are currently in the second section of the graphics processing pipeline, and that are ordered in the second order, are ahead of the selected boundary primitive;

stopping the processing of any graphics primitives in the sequence of graphics primitives that are behind the selected boundary primitive;

continuing the processing of graphics primitives in the graphics processing pipeline that are ahead of the selected boundary primitive to generate from those primitives rendered fragment data for the first render output; and once the processing of graphics primitives that are ahead of the selected boundary primitive is completed:

writing out the current rendered fragment data generated from the processing of the graphics primitives in the sequence of graphics primitives for the first render output, together with data identifying the position of the selected boundary primitive within the sequence of primitives for the first render output such that the graphics processor is able to identify the position of the boundary primitive within the sequence of primitives for the first render output when processing of the first render output is resumed.

10. A graphics processor, wherein the graphics processor comprises a plurality of processing circuits configured to execute a graphics processing pipeline that is operable to process graphics primitives to generate a render output, the graphics processing pipeline comprising, in sequence:

a first section in which graphics primitives are processed strictly in a first order in which they were initially issued into the graphics processing pipeline;

a second section including one or more graphics processing circuits that operate on graphics primitives input to the second section of the graphics processing pipeline from the first section to generate from each of the graphics primitives input to the second section a respective set of one or more graphics fragments to be rendered for the render output, wherein primitives in the second section of the graphics processing pipeline are processed in a second order;

a rendering circuit operable to render graphics fragments generated by the second section of the graphics processing pipeline to generate rendered fragment data for the render output; and a control circuit that is configured to operate the graphics processor such that:

in response to a command to suspend processing of a first render output being generated by the graphics processor:

the control circuit causes the graphics processor to stop issuing any new primitives associated with the first render output into the graphics processing pipeline; and for a sequence of graphics primitives for the first render output that is currently being processed in the graphics processing pipeline:

the control circuit stops the processing of any graphics primitives in the sequence of graphics primitives that are behind a selected suspend operation boundary primitive having a position within the sequence of primitives such that it is guaranteed that all primitives in the sequence of primitives that are behind the position of the selected boundary primitive within the sequence of primitives are currently in the first section of the graphics processing pipeline, and are thus ordered in the first order, whereas any primitives in the sequence of primitives that are currently in the second section of the graphics processing pipeline, and that are ordered in the second order, are ahead of the selected boundary primitive;

the control circuit continues the processing of graphics primitives in the graphics processing pipeline that are ahead of the selected boundary primitive to generate from those primitives rendered fragment data for the first render output; and once the processing of graphics primitives that are ahead of the selected boundary primitive is completed, the control circuit causes:

a write-out circuit of the graphics processor writes out the current rendered fragment data generated from the processing of the graphics primitives in the sequence of graphics primitives for the first render output, together with data identifying the position of the selected boundary primitive within the sequence of primitives for the first render output such that the graphics processor is able to identify the position of the boundary primitive within the sequence of primitives for the first render output when processing of the first render output is resumed.

11. The graphics processor of claim 10, wherein the boundary primitive is further selected such that the processing of graphics primitives in the sequence of graphics primitives for the first render output that lie behind the position of the selected boundary primitive in the sequence of graphics primitives has not yet produced any observable effects for the first render output, such that repeating the processing of any graphics primitives in the first section of the graphics processing pipeline from the beginning will not introduce artefacts into the first render output.

12. The graphics processor of claim 10, wherein the graphics processing pipeline includes a primitive re-ordering circuit, and the selected boundary primitive is a primitive in the primitive re-ordering circuit that is guaranteed to still be the initial order, and wherein in response to receiving a command to suspend processing of the first render output, the primitive re-ordering circuit returns a primitive identifier for the selected boundary primitive.

13. The graphics processor of claim 10, wherein after the generation of the first render output has been suspended, the control circuit causes the graphics processor to generate a second, different render output.

14. The graphics processor of claim 10, wherein the control circuit is further configured to operate the graphics processor such that:

in response to a command to resume processing of a first render output for which the processing was previously suspended:

the control circuit causes the graphics processor to load back in the rendered fragment data generated from the processing of the graphics primitives in the sequence of graphics primitives for the first render output that was completed at the point at which the processing of the first render output was suspended, together with the data identifying the position of the selected suspend operation boundary primitive within the sequence of primitives for the first render output; and the control circuit causes the graphics processor to resume processing of primitives in the sequence of primitives from a position based on the position of the boundary primitive to continue generating the first render output.

15. The graphics processor of claim 10, wherein the graphics processor is a tile-based rendering system, and wherein the first render output is a tile, or set of tiles.

16. A graphics processor, wherein the graphics processor comprises a plurality of processing circuits configured to execute a graphics processing pipeline that is operable to process graphics primitives to generate a render output, the graphics processing pipeline comprising, in sequence:
- a first section in which graphics primitives are processed strictly in a first order in which they were initially issued into the graphics processing pipeline;
- a second section including one or more graphics processing circuits that operate on graphics primitives input to the second section of the graphics processing pipeline from the first section to generate from each of the graphics primitives input to the second section a respective set of one or more graphics fragments to be rendered for the render output, wherein primitives in the second section of the graphics processing pipeline are processed in a second order;
- a rendering circuit operable to render graphics fragments generated by the one or more graphics processing circuits to generate rendered fragment data for the render output; and
- a control circuit that is configured to operate the graphics processor such that:
- in response to a command to resume processing of a first render output for which the processing was previously suspended:
  - the control circuit causes the graphics processor to load back in rendered fragment data generated from the processing of the graphics primitives in the sequence of graphics primitives for the first render output that was written out when the processing of the first render output was suspended, together with data identifying the position of a suspend operation boundary primitive within the sequence of primitives for the first render output at which point the processing of the sequence of primitives for the first render output was suspended; and
  - the control circuit causes the graphics processor to resume processing of primitives in the sequence of primitives for the first render output from a position based on the position of the boundary primitive to continue generating the first render output.

17. The graphics processor of claim 16, wherein the graphics processor is a tile-based rendering system, and wherein the first render output is a tile, or set of tiles.

\* \* \* \* \*